Feb. 11, 1930.                A. PROCTOR                1,746,868
                    HARVESTING OF FLAX AND OTHER CROPS
                          Filed June 21, 1929
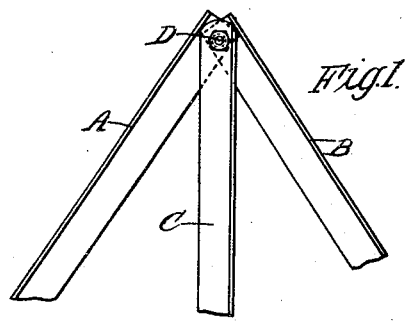
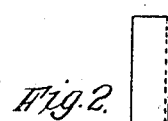
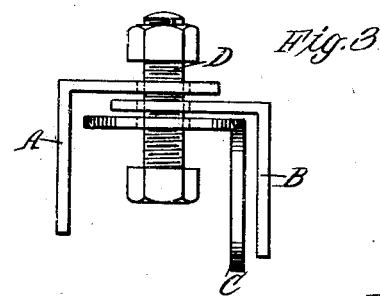
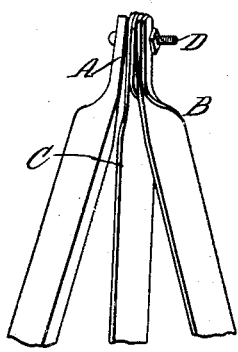
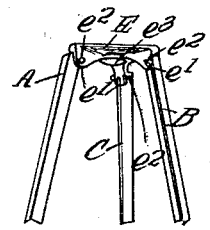
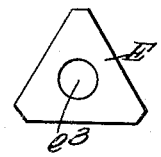
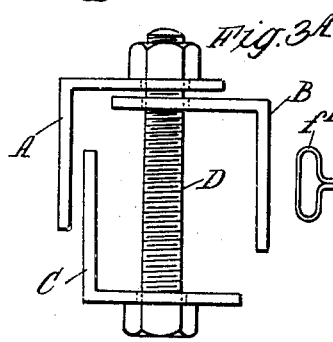
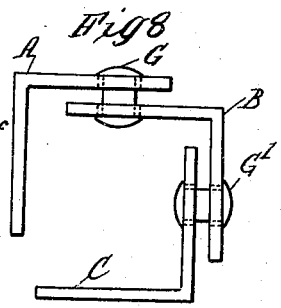

Patented Feb. 11, 1930

1,746,868

UNITED STATES PATENT OFFICE

ALEXANDER PROCTOR, OF BLAIRGOWRIE, SCOTLAND

HARVESTING OF FLAX AND OTHER CROPS

Application filed June 21, 1929, Serial No. 372,730, and in Great Britain January 18, 1928.

This invention relates to the harvesting of flax and other crops in which the stalks of the crop such as flax and grain, after having been mowed or uprooted and bound mechanically or by hand into sheaves by known methods, as also mown hay, are built up into a conical or pyramidal shape somewhat after the fashion of a tent or wigwam around tripods, without or preferably with crossbars, stays, rings or hoops for better securing an air funnel or draught within the structure, which may be denominated as a hut, pike, cole, rick, or stack. The crop is thus kept with an air draught space in the centre, weatherproof and free of harvest risk, and is quickly and safely brought into prime condition for rippling or threshing, or for being built into stacks. The objects of the invention are to construct the tripods in such a manner that they can be readily erected and readily collapsed to lie in the smallest possible space for storage or transport, and to render the construction of the said tripods simple and cheap.

According to the invention a tripod is made of three metal bars or legs of angle iron or the like adjustably secured together, for example by a bolt or rivets of such lengths as to permit of their being opened out into a pyramidal arrangement, the said bars being adapted to lie in parallel order with one bar inside or opposite the adjacent bar when collapsed.

In order that the said invention may be clearly understood and readily carried into effect, the same will now be described more fully with reference to the accompanying drawings, wherein:—

Figures 1 to 3 illustrate one exemplification of the invention, Figure 1 representing the tripod expanded, Figure 2 being an elevation of one bar detached, and Figure 3 a plan on a larger scale of the tripod collapsed.

Figure 3^A is a plan illustrating a different arrangement of the three bars.

Figure 4 represents the upper part of a tripod in which the meeting ends are bent or twisted.

Figure 5 represents another modification in which the three legs are hinged to a triangular plate, and Figure 6 represents the said triangular plate detached.

Figure 7 represents in plan another device for temporarily connecting together the members of a tripod.

Figure 8 represents a modification in which the members are connected by rivets.

The bars A, B and C may be made of angle iron of any suitable length, and may be connected together near their upper extremities by a bolt D (Figures 1, 3, 3^A, 4), or by rivets G, G' (Figure 8). They may be bent as in Figure 4 so that their meeting ends will lie closely together, or as in Figures 1 and 3 the bolt D may be of sufficient length to allow play between the bars, so that they can be spread out to rest their lower ends on the ground in a triangle, and can be collapsed so that they nestle together as in Figure 3.

In the modification illustrated in Figures 5 and 6, the members A, B, C are hinged to a triangular plate E of cast iron or other suitable material provided on its underside with jaws $e'$, a flat portion of the upper end of each member entering each pair of jaws and being secured by a removable split pin or bolt $e^2$ passing through the said jaws and through the said flat portion. Alternatively the triangular plate may be provided with slots through which the end of the member is passed hookwise after it has been flattened out and bent suitably to make the tripod stable, and at the same time to make its members easily detachable. The said triangular plate may have a central hole $e^3$ through which an upright post can be passed to rest on or enter the ground to increase the stability of the structure.

In another modification a steel wire F, Figure 7, may be bent to form two loops $f'$, $f^2$ with parallel portions forming a neck in the centre of which at $f^3$ the ends of the wire are welded together, the hooked upper ends of two of the tripod legs (not shown) passing through the loops and the hook of the other leg passing over the neck. Again, the top of each tripod leg may be bored to give passage to a ring securing the three legs together; or each leg may terminate in a ring instead of a hook, and a bolt may be passed through the three rings, with washers between the said rings if desired; or the three members can be secured together by a ring of rubber, rope, twine, or strand made from the crop or other suitable material.

One or more round or triangular hoops may be dropped over each tripod after erection; or each leg may be provided with two eyelets or slots so that removable horizontal stays or crossbars with cuts therein to form hooked ends can be attached to the tripod by placing the said hooked or cut ends into slots in the legs; or each leg may have a rigid crossbar hinged thereto having at its free end a cut to engage a slot on the next leg, these crossbars when the tripod is collapsed lying parallel with and inside the legs to which they are hinged; or the stays or crossbars may be secured to the legs and each provided with a hinge and a stop in its centre to enable them to collapse only upwards and lie inside or alongside the tripod legs.

What I claim and desire to secure by Letters Patent of the United States is:—

A collapsible tripod for harvesting and preserving flax and other crops, comprising three legs made of angle iron, one side of each leg having an opening adjacent one end and a bolt passing through the respective openings and connecting the legs together at one end, one of said legs being arranged on said bolt in a different relative position from the other two and with its unperforated side on the opposite side of the bolt from the unperforated sides of said other legs and with said unperforated side overlapping the unperforated sides of the other legs, said bolt being of such length and the openings through which the bolt passes being of such size that the legs may be opened out into pyramidal form or collapsed to lie side by side.

ALEXANDER PROCTOR.